US010535443B2

(12) United States Patent
Stoltz et al.

(10) Patent No.: US 10,535,443 B2
(45) Date of Patent: Jan. 14, 2020

(54) GRAPHENE ENTRAINMENT IN A HOST

(71) Applicant: Garmor, Inc., Orlando, FL (US)

(72) Inventors: Richard Stoltz, Plano, TX (US); Jeff Bullington, Orlando, FL (US)

(73) Assignee: Garmor Inc., Orlando, FL (US)

( * ) Notice: Subject to any disclaimer, the term of this patent is extended or adjusted under 35 U.S.C. 154(b) by 0 days.

(21) Appl. No.: 14/773,013

(22) PCT Filed: Mar. 7, 2014

(86) PCT No.: PCT/US2014/021765
§ 371 (c)(1),
(2) Date: Sep. 4, 2015

(87) PCT Pub. No.: WO2014/138587
PCT Pub. Date: Sep. 12, 2014

(65) Prior Publication Data
US 2016/0016803 A1    Jan. 21, 2016
US 2017/0152147 A9    Jun. 1, 2017

Related U.S. Application Data

(60) Provisional application No. 61/775,024, filed on Mar. 8, 2013, provisional application No. 61/775,071, filed on Mar. 8, 2013, provisional application No. 61/775,087, filed on Mar. 8, 2013, provisional application No. 61/775,099, filed on Mar. 8, 2013, provisional application No. 61/775,113, filed on Mar. 8, 2013, provisional application No. 61/788,247, filed on Mar. 15, 2013.

(51) Int. Cl.
*C01B 32/22*    (2017.01)
*C01B 32/225*    (2017.01)
*H01B 1/04*    (2006.01)
*C01B 32/182*    (2017.01)

(52) U.S. Cl.
CPC ............. *H01B 1/04* (2013.01); *C01B 32/182* (2017.08)

(58) Field of Classification Search
CPC . C01B 31/0484; C01B 32/182; C01B 32/184; C01B 32/198; H01B 1/04; B82Y 30/00; B82Y 40/00
USPC ..... 252/502, 510, 511; 423/445 R, 448, 460; 977/895
See application file for complete search history.

(56) References Cited

U.S. PATENT DOCUMENTS

| 2,459,520 | A | 1/1949 | Greenshields |
| 5,057,370 | A | 10/1991 | Krieg et al. |
| 5,360,582 | A | 11/1994 | Boyd et al. |
| 5,501,934 | A | 3/1996 | Sukata et al. |
| 5,506,061 | A | 4/1996 | Kindl et al. |
| 5,509,993 | A | 4/1996 | Hirschvogel |
| 5,583,176 | A | 12/1996 | Haberle |
| 5,883,176 | A | 3/1999 | Gerroir et al. |
| 6,004,712 | A | 12/1999 | Barbetta et al. |
| 6,348,279 | B1 | 2/2002 | Saito et al. |
| 6,436,567 | B1 | 8/2002 | Saito et al. |
| 7,005,205 | B1 | 2/2006 | Gyoten et al. |
| 7,329,698 | B2 | 2/2008 | Noguchi et al. |
| 7,623,340 | B1 | 11/2009 | Song et al. |
| 8,168,964 | B2 | 5/2012 | Hiura et al. |
| 8,216,541 | B2 | 7/2012 | Jang et al. |
| 8,580,132 | B2 | 11/2013 | Lin et al. |
| 9,802,206 | B2 | 10/2017 | Kitaura et al. |
| 2002/0008031 | A1 | 1/2002 | Barsukov et al. |
| 2002/0119358 | A1 | 8/2002 | Rock |
| 2004/0000735 | A1 | 1/2004 | Gilbert, Sr. et al. |
| 2004/0033189 | A1 | 2/2004 | Kaschak et al. |
| 2004/0071896 | A1 | 4/2004 | Kang |
| 2004/0209150 | A1 | 10/2004 | Rock et al. |
| 2005/0191471 | A1 | 9/2005 | Haggquist |
| 2005/0196636 | A1 | 9/2005 | Kawakami et al. |
| 2005/0208319 | A1 | 9/2005 | Finley et al. |
| 2007/0219336 | A1 | 9/2007 | Ito |
| 2007/0284557 | A1 | 12/2007 | Gruner et al. |
| 2008/0048152 | A1 | 2/2008 | Jang et al. |
| 2008/0206124 | A1 | 8/2008 | Jang et al. |
| 2008/0279710 | A1 | 11/2008 | Zhamu et al. |
| 2008/0318110 | A1 | 12/2008 | Budinski et al. |
| 2009/0017211 | A1 | 1/2009 | Gruner et al. |
| 2009/0092747 | A1 | 4/2009 | Zhamu et al. |
| 2009/0140801 | A1 | 6/2009 | Ozyilmaz et al. |
| 2009/0215953 | A1 | 8/2009 | Hwang et al. |

(Continued)

FOREIGN PATENT DOCUMENTS

CN    102021633 A    4/2011
CN    102719719 A    7/2012

(Continued)

OTHER PUBLICATIONS

Extended European Search Report and Opinion for EPO 12844344.7 dated May 10, 2015, 8 pp.
Taeseon, Hwang, et al., "One-step metal electroplating and patterning on a plastic substrate using an electrically-conductive layer of few-layer graphene," Carbon, Elsevier, Oxford, GB, vol. 50, No. 2, Sep. 8, 2011, pp. 612-621.
International Search Report and Written Opinion for PCT/US2015/045657 from KIPO dated Oct. 27, 2015, 6 pp.
International Search Report and Written Opinion for PCT/US2015/049398 from KIPO dated Dec. 16, 2015, 13 pp.

(Continued)

*Primary Examiner* — Tri V Nguyen
(74) *Attorney, Agent, or Firm* — Edwin S. Flores; Chalker Flores, LLP

(57) ABSTRACT

This is generally a method of producing graphene-containing suspensions of flakes of high quality graphene/graphite oxides and method of producing graphene/graphite oxides. Both the exfoliating graphite into flakes and oxidizing the graphite flakes and the preparation and suspension of the flakes can be done with high volume production and at a low cost.

9 Claims, No Drawings

(56) References Cited

U.S. PATENT DOCUMENTS

| | | |
|---|---|---|
| 2009/0241496 A1 | 10/2009 | Pintault et al. |
| 2010/0006445 A1 | 1/2010 | Tomantschger |
| 2010/0055025 A1 | 3/2010 | Jang et al. |
| 2010/0055458 A1* | 3/2010 | Jang ............... B82Y 30/00 428/402 |
| 2010/0056819 A1 | 3/2010 | Jang et al. |
| 2010/0092809 A1* | 4/2010 | Drzal ............... H01M 4/0416 429/413 |
| 2010/0143732 A1 | 6/2010 | Swift et al. |
| 2010/0147188 A1 | 6/2010 | Mamk et al. |
| 2010/0151318 A1 | 6/2010 | Lopatin et al. |
| 2010/0209731 A1 | 8/2010 | Haman |
| 2010/0239870 A1 | 9/2010 | Bowen et al. |
| 2010/0296253 A1 | 11/2010 | Miyamoto et al. |
| 2011/0017585 A1 | 1/2011 | Zhamu et al. |
| 2011/0041980 A1 | 2/2011 | Kim et al. |
| 2011/0049437 A1 | 3/2011 | Crain et al. |
| 2011/0088931 A1 | 4/2011 | Lettow et al. |
| 2011/0143018 A1 | 6/2011 | Peng et al. |
| 2011/0223405 A1 | 9/2011 | Compton et al. |
| 2011/0256376 A1 | 10/2011 | Compton et al. |
| 2011/0267673 A1 | 11/2011 | Agrawal et al. |
| 2011/0274610 A1 | 11/2011 | Paquette et al. |
| 2011/0281034 A1 | 11/2011 | Lee et al. |
| 2012/0025131 A1 | 2/2012 | Forero |
| 2012/0025420 A1 | 2/2012 | Utashiro et al. |
| 2012/0055612 A1 | 3/2012 | Ahmed et al. |
| 2012/0077017 A1 | 3/2012 | Buresch |
| 2012/0107562 A1 | 5/2012 | Bolotin et al. |
| 2012/0129736 A1 | 5/2012 | Tour et al. |
| 2012/0220198 A1 | 8/2012 | Peukert et al. |
| 2012/0228555 A1 | 9/2012 | Cheng et al. |
| 2012/0282419 A1 | 11/2012 | Ahn et al. |
| 2012/0298396 A1 | 11/2012 | Hong et al. |
| 2012/0298620 A1 | 11/2012 | Jiang et al. |
| 2013/0015409 A1 | 1/2013 | Fugetsu |
| 2013/0018204 A1 | 1/2013 | Jeon et al. |
| 2013/0114367 A1 | 5/2013 | Heusinger et al. |
| 2013/0156678 A1 | 6/2013 | Banerjee et al. |
| 2013/0217222 A1 | 8/2013 | Johnson et al. |
| 2013/0236715 A1 | 9/2013 | Zhamu et al. |
| 2013/0240033 A1 | 9/2013 | Jeon et al. |
| 2013/0272950 A1 | 10/2013 | Yun et al. |
| 2014/0018480 A1 | 1/2014 | Lee et al. |
| 2014/0117745 A1 | 5/2014 | Wilke et al. |
| 2014/0134092 A1 | 5/2014 | Shankman |
| 2014/0143018 A1 | 5/2014 | Nies et al. |
| 2014/0204384 A1 | 7/2014 | Lee et al. |
| 2014/0227211 A1 | 8/2014 | Shankman |
| 2014/0272199 A1 | 9/2014 | Lin et al. |
| 2014/0299475 A1 | 10/2014 | Bullington et al. |
| 2015/0368436 A1 | 12/2015 | Chiu et al. |
| 2016/0002045 A1 | 1/2016 | Blair |
| 2017/0233290 A1 | 8/2017 | Christiansen et al. |

FOREIGN PATENT DOCUMENTS

| | | |
|---|---|---|
| CN | 103058541 A | 4/2013 |
| CN | 103408880 A | 11/2013 |
| CN | 103757823 A | 4/2014 |
| CN | 103819915 A | 5/2014 |
| CN | 103962102 A | 8/2014 |
| CN | 104319372 A | 1/2015 |
| CN | 103130436 A | 3/2015 |
| CN | 104446176 A | 3/2015 |
| CN | 104844930 A | 4/2015 |
| EP | 0949704 A1 | 10/1999 |
| EP | 1227531 A1 | 7/2002 |
| EP | 2560228 A1 | 2/2013 |
| EP | 2771395 A1 | 9/2014 |
| EP | 2964573 A1 | 1/2016 |
| EP | 2964574 A4 | 5/2016 |
| GB | 723598 A | 2/1955 |
| JP | 64-009808 A | 1/1989 |
| JP | 2012007224 A | 1/2012 |
| JP | 2012136567 A | 7/2012 |
| JP | 2016508953 A | 3/2016 |
| KR | 20110119429 A | 11/2011 |
| KR | 20130048741 A | 4/2013 |
| KR | 1020130090979 B1 | 10/2013 |
| KR | 1020150026092 | 3/2015 |
| KR | 101625311 B1 | 5/2016 |
| RU | 2456361 C1 | 7/2012 |
| WO | 2008108383 A1 | 12/2008 |
| WO | 2009032069 | 3/2009 |
| WO | 2009059193 A1 | 5/2009 |
| WO | 2010089326 A1 | 8/2010 |
| WO | 2010091352 A2 | 8/2010 |
| WO | 2011014242 A1 | 2/2011 |
| WO | 2011074125 | 6/2011 |
| WO | 2011074125 A1 | 6/2011 |
| WO | 2011078639 A2 | 6/2011 |
| WO | 2011086391 A1 | 7/2011 |
| WO | 2011087301 | 7/2011 |
| WO | 2011087301 A2 | 7/2011 |
| WO | 2011099761 A2 | 8/2011 |
| WO | 2011162727 A1 | 12/2011 |
| WO | 2012058553 A1 | 5/2012 |
| WO | 2012148880 A2 | 11/2012 |
| WO | 2012177864 A1 | 12/2012 |
| WO | 2013001266 A1 | 1/2013 |
| WO | 2013009003 A1 | 1/2013 |
| WO | 2013096990 A1 | 4/2013 |
| WO | 2013062951 A4 | 5/2013 |
| WO | 2013096990 A1 | 7/2013 |
| WO | 2014062226 A1 | 4/2014 |
| WO | 2014080144 A1 | 5/2014 |
| WO | 2014104446 A1 | 7/2014 |
| WO | 2014138587 A1 | 9/2014 |
| WO | 2014138596 A1 | 9/2014 |
| WO | 2014210584 A1 | 12/2014 |
| WO | 2015065893 A1 | 5/2015 |
| WO | 2016028756 A1 | 2/2016 |
| WO | 2016040612 A1 | 3/2016 |
| WO | 2016123080 A1 | 8/2016 |
| WO | 2016149150 A1 | 9/2016 |
| WO | 2016154057 A1 | 9/2016 |
| WO | 2016160400 A1 | 10/2016 |
| WO | 2016167981 A1 | 10/2016 |
| WO | 2016200469 A1 | 12/2016 |
| WO | 2017053204 A1 | 3/2017 |
| WO | 2018008143 A1 | 5/2018 |

OTHER PUBLICATIONS

Wang, Y., et al., "Electrochemical Delamination of CVD-Grown Graphene Film: Toward the Recyclable Use of Copper Catalyst," ACS Nano, vol. 5, No. 12, Oct. 30, 2011, pp. 9927-9933.

Extended European Search Report and Opinion for EPO 14760912.7 dated May 11, 2016, 8 pp.

International Search Report and Written Opinion for PCT/US2016/014873 from KIPO dated May 13, 2016, 15 pp.

International Search Report and Written Opinion for PCT/US2016/023435 from KIPO dated May 30, 2016, 13 pp.

International Search Report and Written Opinion for PCT/US2016/022229 from KIPO dated Jun. 27, 2016, 15 pp.

Ebinezr, et al., "Analysis of hardness test for aluminum carbon nanotube metal matrix and graphene," Indian Journal of Engineering, vol. 10, No. 21, 2014, pp. 33-39.

Liu, Y. B., et al., "Recent development in the fabrication of metal matrix-particulate composites using powder metallurgy techniques," Journal of Materials Science, vol. 29, No. 8, 1994, pp. 1999-2007.

Moustafa, S.F., et al., "Copper matrix SiC and Al2O3 particulate composites by powder metallurgy technique," Materials Letters, 2002, vol. 53, No. 4, pp. 244-249.

Mohajerani, E., et al., "Morphological and thickness analysis for PMMA spin coated films," Journal of Optoelectronics and Advanced Materials, vol. 9:12, Dec. 2007, p. 3901-3906.

(56) References Cited

OTHER PUBLICATIONS

Zhong-Shuai, Wu, et al., "Field Emission of Single-Layer Graphene Films Prepared by Electrophoretic Deposition," Advanced Materials, Jun. 2009, vol. 21, p. 1756-1760.
Fang, Ming et al., "Covalent Polymer Functionalization of Graphene Nanosheets and Mechanical Properties of Composites." Journal of Materials Chemistry, Jul. 9, 2009, vol. 19, No. 38, pp. 7098-7105.
Rafiee, Mohammad A. et al., "Fracture and Fatigue in Graphene Nanocomposites." Small, Jan. 18, 2010, vol. 6, No. 2, pp. 179-183.
Steurer, Peter et al., "Functionalized Graphenes and Thermoplastic Nanocomposites Based Upon Expanded Graphite Oxide." Macromolecular Rapid Communications, Feb. 18, 2009, vol. 30, Nos. 4-5, pp. 316-327.
Wang, Xin et al., "In situ Polymerization of Graphene Nanosheets and Polyurethane with Enhanced Mechanical and Thermal Properties." Journal of materials Chemistry, Feb. 1, 2011, vol. 21, No. 12, pp. 4222-4227.
International Search Report and Written Opinion for PCT/US2016/023273 from KIPO dated Jul. 12, 2016, 16 pp.
International Search Report and Written Opinion for PCT/US2016/025338 from KIPO dated Jul. 25, 2016, 12 pp.
Machine Translation of CN103408880, 20 pp.
Machine Translation of CN10375823, 12 pp.
Machine Translation of CN104319372, 13 pp.
Wu, Z-S. et al., "Field Emission of Single-Layer Films Prepared by Electrophoretic Deposition." Advanced Materials, 21, 2009, pp. 1756-1760.
Academic Press Dictionary of Science and Technology ("Flake", p. 1, obtained onkine Aug. 19, 2016).
Extended European Search Report and Opinion for EPO 14759787.6 dated Oct. 6, 2016, 13 pp.
International Search Report and Written Opinion for PCT/US2016/025307 from KIPO dated Sep. 12, 2016, 11 pp.
Jeon, In-Yup et al., "Edge-carboxylated graphene nanosheets via ball milling." Proceedings of the National Academy of Sciences of the United States of America (PNAS), Apr. 10, 2012, vol. 109, No. 15, pp. 5588-5593.
McQuarrie, 2011, General Chemistry (4th Edition). University Science Books, Appendix G Standard Reduction Voltages for Aqueous Solutions at 25C, p. A-34 to A-37 and also p. 949, Table 25.3. Online version available at: http://app.knovel.com/hotlink!toc/id:kpGCE00013/general-chemistry-4th/general-chemistry-4th).
Merriam-Webster ("Definition of Flake" p. 1-9, obtained online Aug. 19, 2016).
Zhao, W., et al., "Preparation of graphene by exfoliation of graphite using wet ball milling." Journal of Materials Chemistry, Jun. 3, 2010, vol. 20, pp. 5817-5819.
CN104446176A Machine Translation of Bibliography.
International Search Report and Written Opinion for PCT/US2016/052292 from KIPO dated Nov. 21, 2016, 14 pp.
Herman, Allen et al., "Bipolar plates for PEM fuel cells: a review." International Journal of Hydrogen Energy, 2005, vol. 30, No. 12, pp. 1297-1302.
Persulfates Technical Information, FMC, (http://ww.peroxychem.com/media/90826/aod_brochure_persulfate.pdf, downloaded on Jan. 19, 2017) 16 pp.
USP Technologies, "What is the pH of H2O2 solutions?" http://www.h2o2.com/faqs/FaqDetail.aspx?fld=26, accessed Jan. 19, 2017, 2 pp.
English translation of WO2011/078639 A2.

Hwang, T., et al., "One-step metal electroplating and patterning on a plastic substrate using an electrically-conductive layer of few-layer graphene," Carbon 2012, vol. 50, No. 2, Sep. 17, 2011, pp. 12-621.
International Search Report and Written Opinion for PCT/US2012/061457 from KIPO dated Mar. 15, 2013, 10 pp.
International Search Report and Written Opinion for PCT/US2014/021765 from KIPO dated Jul. 24, 2014, 11 pp.
International Search Report and Written Opinion for PCT/US2014/021810 from KIPO dated Jul. 14, 2014, 10 pp.
International Search Report and Written Opinion for PCT/US2014/062371 from KIPO dated Feb. 11, 2015, 12 pp.
Ong, T. S., et al, "Effect of atmosphere on the mechanical milling of natural graphite," Carbon, 2000, vol. 38, No. 15, pp. 2077-2285.
Bourlinos, A.B., et al., "Graphite Oxide: Chemical Reduction to Graphite and Surface Modification with Primary Aliphatic Amines and Amino Acids," Langmuir 2003, vol. 19, pp. 6050-6055.
Feng, H., et al., "A low-temperature method to produce highly reduced graphene oxide," Nature Communications, Feb. 26, 2013, 8 pp.
Szabo, T., et al., "Evolution of Surface Functional Groups in a Series of Progressively Oxidized Graphite Oxides," Chem. Mater., vol. 18, Mar. 29, 2006, pp. 2740-2749.
International Search Report and Written Opinion for PCT/US2017/027231 from KIPO dated Jul. 11, 2017, 18 pp.
Extended European Search Report and Opinion for EPO 17185605.7 dated Nov. 29, 2017, 7 pp.
International Search Report and Written Opinion for PCT/US2017/058512 from KIPO dated Feb. 7, 2018, 14 pp.
Li, Y., et al., "Hybridizing wood cellulose and graphene oxide toward high-performance fibers," NPG Asia Materials, 7, Jan. 9, 2015, 14 pp.
Oh, Won-Chun, et al., "The Effect of Thermal and Ultrasonic Treatment on the Formation of Graphene-oxide Nanosheets," Journal of the Korean Physical Society, vol. 56, No. 4, Apr. 2010, pp. 1097-1102.
Tissera, N., et al., "Hydrophobic cotton textile surfaces using an amphiphilic graphene oxide (GO) coating," Applied Surface Science, 324, Nov. 4, 2014 (2015), pp. 455-463.
Extended European Search Report for EP 16765526.5 dated Feb. 13, 2018, 7 pp.
Extended European Search Report for EP 16769452.0 dated Mar. 1, 2018, 9 pp.
Extended European Search Report for EP 16780450.9 dated Apr. 19, 2018, 17 pp.
Jeon, I-Y., et al., "Large Scale Production of Edge-Selectively Functionalized Graphene Nanoplatelets via Ball Milling and Their Use as Metal-Free Electrocatalysts for Oxygen Reduction Reaction," J Am Chem Soc (2013), 135-1386-1393.
Yuanyuan, L., et al. "Hybridizing Wood Cellulose and Graphene Oxide toward High-Performance Fibers," NPG Asia Materials (2015) 7(e150), 14 pp.
Kaur, S., et al., "Enhanced thermal transport at covalently functionalized carbon nanotube array interfaces," Nature Communications, Jan. 22, 2014, pp. 1-8.
Maguire, J. A., et al., "Efficient low-temperature thermal functionalization of alkanes. Transfer dehydrogenation catalyzed by Rh(PMe3)2Cl(CO) in solution under a high-pressure hydrogen atmosphere," J. Am. Chem. Soc., Aug. 1, 1991, vol. 113:17, pp. 6706-6708.

* cited by examiner

GRAPHENE ENTRAINMENT IN A HOST

TECHNICAL FIELD OF THE INVENTION

The present invention relates in general to the field of graphene, and more particularly, to transitioning graphene into a variety of macroscale mechanical structures.

BACKGROUND OF THE INVENTION

Without limiting the scope of the invention, its background is described in connection with composite materials.

U.S. Pat. No. 8,216,541, issued to Jang, et al. is directed to a process for producing dispersible and conductive nano-graphene platelets from non-oxidized graphitic materials. Briefly, these inventors are said to teach a process for producing nano-graphene platelets (NGPs) that are both dispersible and electrically conducting. The process is said to include: (a) preparing a pristine NGP material from a graphitic material; and (b) subjecting the pristine NGP material to an oxidation treatment to obtain the dispersible NGP material, wherein the NGP material has an oxygen content no greater than 25% by weight. The conductive NGPs are said to find applications in transparent electrodes for solar cells or flat panel displays, additives for battery and supercapacitor electrodes, conductive nanocomposite for electromagnetic wave interference (EMI) shielding and static charge dissipation.

United States Patent Publication No. 20120298620, filed by Jiang, et al., is directed to a method for making graphene composite structure. Briefly the method is said to include providing a metal substrate including a first surface and a second surface opposite to the first surface, growing a graphene film on the first surface of the metal substrate by a CVD method, providing a polymer layer on the graphene film and combining the polymer layer with the graphene film, and forming a plurality of stripped electrodes by etching the metal substrate from the second surface.

Finally, United States Patent Publication No. 20120228555, filed by Cheng, et al., is directed to a method of making graphene. Briefly, the application is said to disclose a method for making graphene by providing a starting material and heating the starting material for a time and to a temperature effective to produce graphene. In certain embodiments the applicants are said to use starting materials that include carbonaceous materials used in conjunction with, or comprising, sulfur, and essentially free of a transition metal. The graphene produced by the current method is said to be used to coat graphene-coatable materials.

SUMMARY OF THE INVENTION

In one embodiment the present invention includes a method of making a graphene suspension, comprising: preparing graphene flakes with a surface area to thickness ratio greater than 300 Angstroms, and thickness of less than 160 Angstroms, wherein the graphene flakes have no significant physical surface distortions and have a surface polarity; preparing a polar or nonpolar fluid having the same polarity as said graphene flakes; and suspending said graphene flakes in said fluid by mixing until the suspension is substantially uniform. In one aspect, the suspension is a carbon allotrope. In another aspect, 95% of the flakes are from about 0.8 to 16 nanometers in thickness. In another aspect, 95% of the flakes have a surface area to thickness ratio of a minimum of 300 Angstroms. In another aspect, the maximum dimension of the flakes between 220 Angstroms and 100 microns. In another aspect, the Graphene flake has only edge oxidation. In another aspect, the method further comprises adding a bonding host and the flake surfaces have the same polarity as the bonding host. In another aspect, the mechanically exfoliating graphite into graphene flakes in done in a stirred media mill, and the stirred media mill is an Attrition mill or ball mill. In another aspect, the method outputs are substantially limited to substantially flat graphene flakes and water.

Another embodiment the present invention includes a method of making a graphene suspension, comprising: preparing graphene flakes with a surface area to thickness ratio greater than 300 Angstroms, and thickness of less than 160 Angstroms, wherein the graphene flakes are substantially planar and have a surface polarity; and suspending said graphene flakes in a fluid by mixing until the suspension is substantially uniform. In one aspect, the suspension is a carbon allotrope. In another aspect, 95% of the flakes are from about 0.8 to 16 nanometers in thickness. In another aspect, 95% of the flakes have a surface area to thickness ratio of a minimum of 300 Angstroms. In another aspect, the maximum dimension of the flakes between 220 Angstroms and 100 microns. In another aspect, the Graphene flake has only edge oxidation. In another aspect, the method further comprises adding a bonding host and the flake surfaces have the same polarity as the bonding host. In another aspect, the mechanically exfoliating graphite into graphene flakes in done in a stirred media mill, and the stirred media mill is an Attrition mill or ball mill. In another aspect, the method outputs are substantially limited to substantially flat graphene flakes and water.

Yet another embodiment of the present invention includes a graphene suspension made by a method comprising: preparing graphene flakes with a surface area to thickness ratio greater than 300 Angstroms, and thickness of less than 160 Angstroms, wherein the graphene flakes have no significant physical surface distortions and have a surface polarity; preparing a polar or nonpolar fluid having the same polarity as said graphene flakes; and suspending said graphene flakes in said fluid by mixing until the suspension is substantially uniform. In one aspect, 95% of the flakes are from about 0.8 to 16 nanometers in thickness. In another aspect, 95% of the flakes have a surface area to thickness ratio of a minimum of 300 Angstroms. In another aspect, the maximum dimension of the flakes between 220 Angstroms and 100 microns.

Yet another embodiment of the present invention includes a graphene suspension made by a method comprising: preparing graphene flakes with a surface area to thickness ratio greater than 300 Angstroms, and thickness of less than 160 Angstroms, wherein the graphene flakes are substantially planar and have a surface polarity; and suspending said graphene flakes in a fluid by mixing until the suspension is substantially uniform. In one aspect, 95% of the flakes are from about 0.8 to 16 nanometers in thickness. In another aspect, 95% of the flakes have a surface area to thickness ratio of a minimum of 300 Angstroms. In another aspect, the maximum dimension of the flakes between 220 Angstroms and 100 microns.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Despite these nanoscale mechanical properties, graphene previously had not been able to be transitioned to a macroscale mechanical structure. The process of producing a loaded host did not translate to a viable composite structure. The inability to translate the technology to a viable composite structure was a combination of technical issues and cost factors, including uniform distribution of the suspension in the host material. The technical limitation included stochastic processes in the curing of the host while obtaining a distribution of the suspension. Curing of the host material resulted in random shrinkage phenomena, which was exacerbated in larger composite structures/devices. If a suspension was added to the host prior to curing, polymerization, hydrolyzation or other thermal, mechanical, chemical processes that initiation either long-range or short-range ordering bonding the distribution of the non-uniform suspension creating weak regions and failure points in the loaded host material.

Graphene is an allotrope of carbon. Graphene's purest form is a one-atom-thick planar sheet of $sp^2$-bonded carbon atoms that are densely packed in a honeycomb or hexagonal crystal lattice. Graphene used as an additive have been shown superior mechanical, chemical, thermal, gas barrier, electrical, flame retardant and other properties compared to the native host. Improvement in the physicochemical properties of the host depends on: 1) a uniform distribution and entrainment of the graphene flake, 2) optimizing the interfacial bonding between the graphene flake and host's matrix, 3) removal of gasses entrained in the host during processing, 4) optimizing the additive's innate properties, e.g. flatness, and/or 5) optimizing the thickness to surface-area ratio of the graphene flake.

Optimal properties of the graphene flake: We have found that the performance of a graphene flake is dominated by both the texture and the surface and edge oxidation/functionalization. A Hummer's based process produces graphene flakes that have both a surface and edge oxidation. The degree of oxidation and exfoliation inherent in the Hummer's or modified based Hummer's process results in permanent corrugated disfiguration of the graphene flake. The combination low yield, high cost and inconsistent performance makes the approach not viable. The permanent corrugated structure degrades the chemical, mechanical, electrical and thermal properties of graphene flake. Hence a surface oxidized graphene flake has lower performance than the single-layer graphene originally demonstrated when the graphene was first discovered in 2007. This can explain by simple theoretical analysis where the corrugated structure induces different shearing and loading forces to the surrounding host as the corrugated structure gives a third dimension to the ideal two dimension graphene structure. In the transmission of phonons or electrons the ideal structure is a uniform flat large area graphene structure. This is illustrated by the development activities of the semiconductor industry as they focused chemical vapor deposition thin film generated graphene material. A corrugated structure induces resistance and inductance to the transmission of phonons and electrons hence a planar flake has higher performance in the electron and phonon transmission relative to a corrugated structure in the surface oxidized graphene flake.

This can be a method of making a graphene suspension, comprising: preparing graphene flakes with a surface area to thickness ratio greater than 300 Angstroms, and thickness of less than 160 Angstroms, wherein the graphene flakes have no significant physical surface distortions and have a surface polarity; preparing a polar or nonpolar fluid having the same polarity as said graphene flakes; suspending said graphene flakes in said fluid by mixing until the suspension is substantially uniform.

In one embodiment, the suspension is a carbon allotrope; 95% of the flakes are from about 0.1 to 16 nanometers in thickness; 95% of the flakes have a surface area to thickness ratio of a minimum of 300 Angstroms; the maximum dimension of the flakes between 220 Angstroms and 100 microns; the Graphene flake has only edge oxidation; the flake surface has the same polarity as the bonding host; the mechanically exfoliating graphite into graphene flakes in done in a stirred media mill, and the stirred media mill is an Attrition mill or ball mill; and/or the method outputs are substantially limited to substantially flat graphene flakes and water.

The present invention also includes a method of making a graphene suspension, comprising: Preparing graphene flakes with a surface area to thickness ratio greater than 300 Angstroms, and thickness of less than 160 Angstroms, wherein the graphene flakes are substantially planar and have a surface polarity; Suspending said graphene flakes in said fluid by mixing until the suspension is substantially uniform.

Recent publications have shown one possible rout to produce a non corrugated graphene through the of ball milling crystalline graphite with dry ice the chemo-mechanical processing of the crystalline graphite produces edge oxidized graphene flakes. This process shows the feasibility of an edge-only oxidized graphene flake but cost of this processing is more expensive as required by a commodity additive market. Note that planar graphene graphite for research has also been produced by manually separating one layer at time from a piece of crystalline graphite. Needless to say this is far too slow and too expensive for commercial production. The Hummer's based process produces graphene that is not planar, generally weaken the graphite in a host.

Optimizing the interfacial bonding between the graphene flake and host's matrix. Optimizing the interfacial bonding requires the two critical aspects, first is the providing of a planar pristine surface that is not distorted through the graphene production process. Secondly is the modification of the chemistry of the additive to allow full entrainment of the additive in host's matrix. For graphene this can be the modifying the OOH group with other chemical functionality to tailor the additive to be hydrophilic or hydrophobic and/or create a functional group on the additive that is similar to the host's chemistry (i.e., polarity, hydrophilicity, etc.). Creating the correct hydrophobicity allows the graphene additive to be maintained in suspension in a variety of common solvent hosts prior to long or short range ordering or bonding (e.g. a solid). Functionalizing the graphene additive with a similar chemistry to the host allows the graphene additive to be directly incorporated in the long or short range ordering or bonding. The fluids can include plastics, metals, ceramics and glass.

Thickness to surface area ratio of the graphene flake: Using a planar graphene flake the next issue of implementing in a host is the thickness to surface-area of the graphene flake. The thickness to surface-area ratio of the graphene flake plays a significant ability in the graphene flakes ability to positively impact the host's properties.

This large surface with a modest thickness is conceptually comparable to the ideal larger area monolayer need by the semiconductor industry. A large flat flake will conduct better phonons and electrons better than the host alone. A multi-layer graphene flake held bonded even by with van der Waal forces is more desirable than a thin flake surround by an insulating host. This is true for mechanical applications as well. As long as there is a larger surface area to thickness ratio the graphene can mitigate and distribute a mechanical load giving the host enhanced mechanical properties, increased tensile, shear, and flexural strength. The ability to achieve substantial enhancement of the host's mechanical properties can e.g. be obtained with a flake with an area of 48,400 Å$^2$ with a flake thickness to 160 Å to 200 Angstroms. A 48,400 Å$^2$ area flake with a thickness of 160 Å has a surface area to thickness ratio of about 300 Angstroms can also provide enhancement to the host's mechanical properties (preferably 95% of the graphene flakes of the present invention have a surface area to thickness ratio of a minimum of 300 Angstroms).

In some embodiments our flake thicknesses are 16 nanometers or less as too many layers significantly reduce the tensile strength (preferably 95% of the graphene flakes of the present invention are from about 0.8 to 16 nanometers), and our surface area to thickness ratio is greater than 48400 to 1 Angstroms. Preferably, the maximum dimension of the flake varies between 220 Angstroms and 100 microns. This requires precise process control or a process that allows separation of the graphene flakes by surface area and/or thickness.

Uniform distribution and entrainment: The third aspect of obtaining an effective uniform distribution and entrainment of graphene flake as an additive in the host fluid is the aggressively mixing the flake into the host fluid (for example, under an at least partial vacuum), prior to reacting, casting or otherwise causing the host to become ordered by thermal, chemical, electrical or other processes that induce order or bonding in the host, e.g. solidified of gelled. In some embodiments, epoxy that is dried is used, and then thermally set after mixing. In one embodiment of the present invention, greater than 6% loading of graphene is used (e.g. between 6 and 35%). Studies on attaining increased potency of fillers by using different mixing techniques, modification of polymer backbone or filler surface, use of functional polymers and coupling agents, etc. Graphene, has low surface energy as compared with crystalline graphite (the cost-effective precursor for graphene/graphene oxide). One of the routes to overcome this limitation is the functionalization of flake surface, which results in significant enhancement of the mechanical and electrical properties of polymer composites. As graphene is being entrained in a host a mild vacuum may be applied to prevent gasses from being incorporated in the host. The formation of gas bubbles increase resistance to phonon and electron transpiration in addition creating light scattering centers and mechanical defect sights in a host.

Obtaining consistent size and thickness can require controlled pre-processing (e.g., milling and separation) of the crystalline graphite. Chemo-mechanical processing can use crystalline graphite with a mild oxidizing agent in conjunction with mechanical energy (milling) for synthesis of graphene.

The mechanical energy in conjunction with a mild oxidizing environment can produce edge oxidation of the graphene minimizing the surface oxidation and mechanical defects generated in a Hummer's based process.

Graphite (TC306, 30 g) can be used as the starting material for the graphene chemo-mechanical process. Chemo-mechanical process can be done in what is generically referred to as a "stirred ball mill." A useful and simple equation describing the grinding momentum is M×V (mass× velocity), which enables us to see how an ball milling use up to 6 lbs (2.7 Kg) (or ~2,600 stainless steel balls) of 0.25" diameter stainless steel balls weighing 1 g each. Milling in a closed chamber for 360 minutes at 2,000 RPM or less. When grinding in the ball milling as the balls (media) in their random movement are spinning in different rotation and, therefore, exerting shearing forces on the crystalline graphite. The resulting graphene preferably has edge-only oxidized flakes with a pristine surface free of distortions or corrugations with low surface energies allowing for easier incorporation and entrainment in a host with enhance graphene physical properties.

The oxidation of the graphene can occur from a wide range of methods of making graphene oxide, comprising: Putting crystalline graphite and an atomizer or aerosolized oxidizing agent in a mill, wherein the atomizer or aerosolized oxidizing exfoliating agent contains only carbon, oxygen, hydrogen and combinations thereof; Milling said crystalline graphite and atomizer or aerosolized oxidizing exfoliating agent to produce planar graphene flakes having a thickness of less than 160 Angstroms; and Suspending said graphene flakes in a fluid to remove the graphene flakes from the mill.

This can be a technique for low cost, mass-production of a partially oxidized to fully oxidized graphite/graphene using mechanical processing (Attritor Mill) in conjunction with a water soluble exfoliating agent, such as kaolin clay powder and at least one of atomizer or aerosolized carbolic acid or oxalic acid ($C_2H_2O_4$), acetic acid, carbonic acid or ethanoic ($CH_3CO)_2O$, and citric acid. Aerosolization can be accomplished by an Ultrasonic Atomizer Processor, ultrasonic spray & atomization system made by U&STAR Ultrasonic Technology. An ultrasonic spray system, uses an ultrasound technology to atomize liquid or powders generated from ultrasonic energy that scattered the liquid forming droplets ranging microns to more than 100 microns. Liquid droplets that may contain powders and soluble matter, promoting chemical reaction, and spraying. This ultrasonic spray atomization has low power, large volume. An ultrasonic spray system widely applied on kinds of industrial applications including ultrasonic spraying liquid, metal power water nebulization or atomization. The controlled small droplet sizes provide a high surface to volume ratio enhancing efficiency and control chemical reactions.

The atomizer or aerosolized oxidizing agent is injected into a mill in addition to the crystalline graphite. Directly milling of graphite powder without concentrated acid, for aerosolized oxidizing, to produce high quality oxidized graphene. After milling the crystalline graphite with an aerosolized oxidizing agent is injected into the attritor mill for a minimum of 30 min to produce an aqueous slurry. The aqueous slurry contains a mild acid that breaks down into water and graphite. The water can dissolve the water-soluble exfoliating agent. An example of a water-soluble exfoliating agent is kaolin clay powder. The mild aerosolized oxidizing agent produces oxidized graphene with no distortion or texturing. Textured graphene oxide produces significant problems when depositing the graphene oxide, using the graphene oxide in a suspension or as an additive to other materials.

Directly milling of graphite powder with a chemically stable gaseous oxidizing agent in addition to the gaseous oxidizing agent a water-soluble exfoliating agent, such as kaolin clay powder can be added to process to produce high quality edge oxidized graphene. After exfoliating the crystalline graphite in the Attritor mill for 90 min with steel balls and chemically stable gaseous oxidizing agent is introduced. Once the carbon dioxide is released and the pressure in the Attritor exceeds two atmospheres the chemo-mechanical processing initiate graphene oxidation resulting edge oxidized graphene. As the chemo-mechanical processing continues pressure in the chamber decreases in the Attritor mill. Keeping the Attritor mill at an elevate pressure during the oxidation process enables a higher level of oxidation of the graphene flakes.

Additionally graphene oxide may be made, by: Putting crystalline graphite, and vapor phase oxidizing agent in a mill, wherein the oxidizing agent comprises nitrogen, carbon, oxygen, hydrogen and/or combinations thereof; Milling said crystalline graphite and vapor phase oxidizing agent to produce planar graphene flakes having a thickness of less than 160 Angstroms; and Suspending said graphene flakes in a fluid to remove the graphene flakes from the mill.

This can also be a method of making graphene oxide, comprising: Putting crystalline graphite, mineral-based exfoliating media and vapor phase oxidizing agent in a mill, wherein the oxidizing agent comprises nitrogen, carbon, oxygen, hydrogen and/or combinations thereof; Milling said crystalline graphite, mineral-based exfoliating media and vapor phase oxidizing agent where water vapor or liquid is combined to produce a mild acidic slurry where the slurry enhances the exfoliation of the graphite to produce planar graphene flakes having a thickness of less than 160 Angstroms; and additional water is added at the end of the process to remove the water soluble exfoliating agent leaving water and graphene flakes.

This can be a method of making graphene oxide, comprising: Putting crystalline graphite and anhydrous oxidizing exfoliating agent in a mill, wherein the anhydrous oxidizing exfoliating agent contains only carbon, oxygen, hydrogen and combinations thereof; Milling said crystalline graphite and anhydrous oxidizing exfoliating agent to produce planar graphene flakes having a thickness of less than 160 Angstroms; and Suspending said graphene flakes in a fluid to remove the graphene flakes from the mill.

Preferably, the milling is done in a stirred mill; the stirred mill is an Attrition mill or Attritor; the method outputs are substantially limited to substantially flat graphene flakes and carbon, oxygen, hydrogen and combinations thereof; and/or the anhydrous oxidizing exfoliating agent is at least one of crystal carbolic acid or anhydrous oxalic acid ($C_2H_2O_4$), Acetic anhydride, or ethanoic anhydride ($CH_3CO)_2O$, and anhydrous citric acid powder.

If the suspension application requires a narrow size distribution the edge oxide graphene can be chemically separated via acidic precipitation by titrating hydrochloric acid into the bath the larger (thicker/heavier) material comes out of suspension first creating a narrow graphene oxide flake distribution. The particle size can be monitored during this process by Dynamic Light Scattering measurement tool. Dynamic Light Scattering tools can resolve particle sizes down to 30 Å.

Preferably, the surface area to thickness ratio should be greater than about 300 to have a positive impact on the host as a suspension. The pH of the water containing the oxidized graphite/graphene can range from 5 to 9 while maintaining the suspension of the media the pH of the resulting water/graphene mixture is typically is about 7. A chemo-mechanical can be controlled to process graphene with oxidization of from 1% to 35%. Unless otherwise indicated or produced by the Hummer process, the term "graphene" as used herein means graphene with oxidization of from 1% to 35%. The functionalization can be COOH on the edge carbons preserving the graphene structure.

Oxidized graphite produced by this method is typically hydrophilic and easily suspended in a neutral aqueous solution. The oxidized graphite can be kept in suspension until varying the pH of the solution.

A ball mill operating with less than or equal to 2,000 RPM can be generally sufficient to prevent agglomeration of the graphene adhering to the milling balls or tank.

The graphene can be combined with the host material in a mechanical agitation process.

Graphene is diamagnetic and as such dynamic magnetic fields can be used to enhance orientation and mixing along in addition other method such as: melt blending, counter rotating screw, sonication or other mixing processes of the graphene additive into the host material prior to inducing ordering or bonding in the host. The entrainment and uniform dispersement preferably uses a minimum of 30 minutes of and less than 600 minutes in a ball mill.

The resulting graphene entrained host can be the cast, extruded or otherwise processed into the final product by inducing long or short range ordering or bonding through chemical, thermal, electrical, shearing, or mechanical treatments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a graphene suspension, comprising:
   preparing graphene flakes with a surface area to thickness ratio greater than 300 Angstroms, and thickness of less than 160 Angstroms, without concentrated acid, wherein the graphene flakes are planar, have no physical distortions or corrugations, have only edge oxidation, and have a surface polarity;
   suspending said graphene flakes in a fluid by mixing until the suspension is substantially uniform; and
   wherein the graphene flakes have an oxidization greater than or equal to 1% and less than 5%.

2. The method of claim 1, wherein 95% of the flakes are from about 0.8 to 16 nanometers in thickness.

3. The method of claim 1, wherein 95% of the flakes have the surface area to thickness ratio greater than 300 Angstroms.

4. The method of claim 1, wherein a maximum dimension of the graphene flakes is between 220 Angstroms and 100 microns.

5. The method of claim 1, wherein the method outputs are substantially limited to flat graphene flakes and water.

6. A graphene suspension made by a method comprising:
   preparing graphene flakes with a surface area to thickness ratio greater than 300 Angstroms, and thickness of less than 160 Angstroms, without concentrated acid, wherein the graphene flakes are planar, have no physical distortions or corrugations, have only edge oxidation, and have a surface polarity;
   suspending said graphene flakes in a fluid by mixing until the suspension is substantially uniform; and
   wherein the graphene flakes have an oxidization of greater than or equal to 1% and less than 5%.

7. The method of claim 6, wherein 95% of the flakes are from about 0.8 to 16 nanometers in thickness.

8. The method of claim 6, wherein 95% of the flakes have the surface area to thickness ratio greater than 300 Angstroms.

9. The method of claim 6, wherein a maximum dimension of the graphene flakes is between 220 Angstroms and 100 microns.

* * * * *